US012083697B2

(12) United States Patent
Choi

(10) Patent No.: US 12,083,697 B2
(45) Date of Patent: Sep. 10, 2024

(54) CUTTING DEVICE AND METHOD FOR CUTTING SUBSTRATE USING THE SAME

(71) Applicant: Samsung Display Co., LTD., Yongin-si (KR)

(72) Inventor: Sehun Choi, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/748,567

(22) Filed: May 19, 2022

(65) Prior Publication Data

US 2023/0119886 A1 Apr. 20, 2023

(30) Foreign Application Priority Data

Oct. 20, 2021 (KR) ........................ 10-2021-0140298

(51) Int. Cl.
*B26D 1/24* (2006.01)
*B26D 5/08* (2006.01)

(52) U.S. Cl.
CPC ............. *B26D 1/245* (2013.01); *B26D 5/086* (2013.01)

(58) Field of Classification Search
CPC .. B26D 1/24; B26D 5/08; B26D 5/085; C03B 33/10; C03B 33/107; B23Q 3/15-1546
See application file for complete search history.

(56) References Cited

U.S. PATENT DOCUMENTS 3,106,018 A * 10/1963 Judd, Jr. ................. C03B 33/12 30/164.95
3,760,997 A * 9/1973 Bier ........................ C03B 33/10 83/881
3,821,910 A * 7/1974 Tjaden .................... C03B 33/10 83/881
4,401,001 A * 8/1983 Gerber .................. B26F 1/3826 83/881
5,924,618 A * 7/1999 Doak ...................... C03B 33/10 83/575

(Continued)

FOREIGN PATENT DOCUMENTS

JP 5538090 7/2014
KR 10-0863439 10/2008

(Continued)

*Primary Examiner* — Adam J Eiseman
*Assistant Examiner* — Richard D Crosby, Jr.
(74) *Attorney, Agent, or Firm* — KILE PARK REED & HOUTTEMAN PLLC

(57) ABSTRACT

A cutting device includes an upper cutting portion and a lower cutting portion. The upper cutting portion includes an upper head portion movable in a first and a second direction, an upper holder connected to the upper head portion, and an upper cutting wheel connected to the upper holder. The upper holder includes an upper body portion connected to the upper head portion, an upper cutting wheel fixing portion rotatable with respect to the upper body portion, and an upper magnetic portion disposed on sides of the upper cutting wheel fixing portion including a magnetic substance. The lower cutting portion includes a lower head portion movable in the first and the second direction, a lower holder connected to the lower head portion, a lower cutting wheel connected to the lower holder, and an upper holder rotation inducing portion connected to the lower head portion including a magnetic substance.

13 Claims, 18 Drawing Sheets

(56) References Cited

U.S. PATENT DOCUMENTS

| | | | | |
|---|---|---|---|---|
| 7,770,500 | B2 * | 8/2010 | Nishio | B65G 49/065<br>225/2 |
| 8,997,619 | B2 * | 4/2015 | Sasaki | C03B 33/107<br>83/886 |
| 9,458,048 | B2 * | 10/2016 | Sasaki | C03B 33/10 |
| 2003/0084578 | A1 * | 5/2003 | Ishikawa | C03B 33/10<br>33/18.1 |
| 2006/0137504 | A1 * | 6/2006 | Nishio | C03B 33/09<br>162/194 |
| 2007/0214925 | A1 * | 9/2007 | Nishio | B28D 5/0011<br>83/559 |
| 2009/0308219 | A1 * | 12/2009 | Yamamoto | B28D 1/225<br>83/676 |
| 2011/0132954 | A1 * | 6/2011 | Tomei | B28D 1/225<br>225/2 |
| 2011/0314990 | A1 * | 12/2011 | Sasaki | C03B 33/107<br>83/663 |
| 2015/0166398 | A1 * | 6/2015 | Sasaki | C03B 33/10<br>83/886 |

FOREIGN PATENT DOCUMENTS

| | | |
|---|---|---|
| KR | 10-0880809 | 2/2009 |
| KR | 10-2012-0052007 | 5/2012 |
| KR | 10-2014-0124215 | 10/2014 |
| KR | 10-2019-0054226 | 5/2019 |

* cited by examiner

CUTTING DEVICE AND METHOD FOR CUTTING SUBSTRATE USING THE SAME

CROSS-REFERENCE TO RELATED APPLICATION(S)

This U.S. non-provisional patent application claims priority to and the benefit of Korean Patent Application No. 10-2021-0140298 under 35 U.S.C. § 119, filed in the Korean Intellectual Property Office on Oct. 20, 2021, the entire contents of which are incorporated herein by reference.

BACKGROUND

1. Technical Field

The disclosure relates to a cutting device and a substrate cutting method using the same.

2. Description of the Related Art

A display device displays images on a screen and includes a liquid crystal display (LCD) and an organic light emitting diode (OLED) display. The display device may be used for various electronic devices such as a portable phone, a GPS, a digital camera, an electronic book, a portable game device, or various terminals.

The display device may include a substrate. To manufacture a display device, a pattern may be formed on a wide substrate, and the substrate may be cut, thereby manufacturing multiple display devices.

A cutting device for cutting a substrate may be used. A substrate may be cut in many directions while moving a cutting wheel of the cutting device in a direction. T change the cutting moving direction, a wheel may need to be turned, and a space for turning the wheel may be needed in the substrate. Recently, a space has been narrowly designed, and a space for turning the wheel may be insufficient so the cutting process may be progressed while the cutting wheel is not yet appropriately arranged. Accordingly, the substrate may be damaged, or the cutting wheel may be damaged.

The above information disclosed in this Background section is only for enhancement of understanding of the background of the described technology, and therefore it may contain information that does not form the prior art that is already known in this country to a person of ordinary skill in the art.

SUMMARY

The described technology has been made in an effort to provide a cutting device for preventing quality issue of a display device due to a damage to a substrate in a process of cutting a substrate or preventing a cutting wheel damage of a cutting device, and a substrate cutting method using the same.

A cutting device may include an upper cutting portion, and a lower cutting portion disposed under the upper cutting portion. The upper cutting portion may include an upper head portion movable in a first direction and a second direction, an upper holder connected to the upper head portion, and an upper cutting wheel connected to the upper holder. The upper holder may include an upper body portion connected to the upper head portion, an upper cutting wheel fixing portion rotatable with respect to the upper body portion, and an upper magnetic portion disposed on sides of the upper cutting wheel fixing portion, and including a magnetic substance. The lower cutting portion may include a lower head portion movable in the first direction and the second direction, a lower holder connected to the lower head portion, a lower cutting wheel connected to the lower holder, and an upper holder rotation inducing portion connected to the lower head portion and including a magnetic substance.

The upper magnetic portion may include a first magnetic substance disposed on a first side of the upper cutting wheel fixing portion, and a second magnetic substance disposed on a second side of the upper cutting wheel fixing portion, and the first magnetic substance and the second magnetic substance may have opposite polarities.

The upper cutting wheel may rotate in association with movement of the upper head portion, and a rotation axis of the upper cutting wheel may be spaced from a fixation axis of the upper body portion in a direction opposite to a moving direction of the upper head portion.

The first magnetic substance may be disposed on a left side of the upper cutting wheel with respect to the moving direction of the upper head portion and may have N-polarity, and the second magnetic substance may be disposed on a right side of the upper cutting wheel with respect to the moving direction of the upper head portion and may have S-polarity.

The upper holder rotation inducing portion may include: a lower cylinder connected to a first side of the lower head portion; a lower stage movable in a third direction by the lower cylinder, is the third direction being perpendicular to the first direction and the second direction; and an upper holder rotation inducing a magnetic portion disposed on the lower stage.

The upper holder rotation inducing magnetic portion may include a first rotation inducing portion, a second rotation inducing portion, a third rotation inducing portion, and a fourth rotation inducing portion sequentially disposed in the first direction, the first rotation inducing portion and the second rotation inducing portion may include an S-polarity magnetic substance and an N-polarity magnetic substance disposed in the second direction, the third rotation inducing portion and the fourth rotation inducing portion may include an S-polarity magnetic substance and an N-polarity magnetic substance disposed in the first direction, an orientation of the S-polarity magnetic substance and the N-polarity magnetic substance of the first rotation inducing portion and an orientation of the S-polarity magnetic substance and the N-polarity magnetic substance of the second rotation inducing portion may be opposite to each other, and an orientation of the S-polarity magnetic substance and the N-polarity magnetic substance of the third rotation inducing portion and an orientation of the S-polarity magnetic substance and the N-polarity magnetic substance of the fourth rotation inducing portion may be opposite to each other.

The S-polarity magnetic substance of the third rotation inducing portion and the S-polarity magnetic substance of the fourth rotation inducing portion may be integral with each other.

The lower holder may include a lower body portion connected to the lower head portion, a lower cutting wheel fixing portion rotatable with respect to the lower body portion, and a lower magnetic portion disposed on respective sides of the lower cutting wheel fixing portion and including a magnetic substance. The upper cutting portion may include a lower holder rotation inducing portion including a magnetic substance, and the lower holder rotation inducing portion may be connected to the upper head portion.

The lower magnetic portion may include: a third magnetic substance disposed on a first side of the lower cutting wheel fixing portion; and a fourth magnetic substance disposed on a second side of the lower cutting wheel fixing portion, and the third magnetic substance and the fourth magnetic substance may have opposite polarities.

The lower cutting wheel may rotate in association with movement of the lower head portion, and the rotation axis of the lower cutting wheel may be spaced from the fixation axis of the lower body portion in a direction opposite to a moving direction of the lower head portion.

The third magnetic substance may be disposed on the left side with respect to the moving direction of the lower head portion and may have S-polarity, and the second magnetic substance may be disposed on the right side with respect to the moving direction of the upper head portion and may have N-polarity.

The lower holder rotation inducing portion may include: an upper cylinder connected to a first side of the upper head portion; an upper stage movable in a third direction that is perpendicular to the first direction and the second direction by the upper cylinder; and a lower holder rotation inducing a magnetic portion disposed under the upper stage.

The lower holder rotation inducing magnetic portion may include a fifth rotation inducing portion, a sixth rotation inducing portion, a seventh rotation inducing portion, and an eighth rotation inducing portion sequentially disposed in the first direction. The fifth rotation inducing portion and the sixth rotation inducing portion may include an S-polarity magnetic substance and an N-polarity magnetic substance disposed in the second direction. The seventh rotation inducing portion and the eighth rotation inducing portion may include an S-polarity magnetic substance and an N-polarity magnetic substance disposed in the first direction. An orientation of the S-polarity magnetic substance and the N-polarity magnetic substance of the fifth rotation inducing portion and an orientation of the S-polarity magnetic substance and the N-polarity magnetic substance of the sixth rotation inducing portion may be opposite to each other. An orientation of the S-polarity magnetic substance and the N-polarity magnetic substance of the seventh rotation inducing portion and an orientation of the S-polarity magnetic substance and the N-polarity magnetic substance of the eighth rotation inducing portion may be opposite to each other.

The S-polarity magnetic substance of the seventh rotation inducing portion and the S-polarity magnetic substance of the eighth rotation inducing portion may be integral with each other.

Another embodiment provides a method for cutting a substrate, including: disposing a substrate between an upper cutting portion and a lower cutting portion to face each other, and cutting the substrate; moving a lower holder rotation inducing magnetic portion of the upper cutting portion to a bottom side; moving an upper holder rotation inducing magnetic portion of the lower cutting portion to a top side; moving an upper head portion of the upper cutting portion and a lower head portion of the lower cutting portion to rotate an upper cutting wheel fixing portion of the upper cutting portion and a lower cutting wheel fixing portion of the lower cutting portion; moving a lower holder rotation inducing a magnetic portion of the upper cutting portion to the top side; moving an upper holder rotation inducing magnetic portion of the lower cutting portion to the bottom side; and disposing the upper cutting portion and the lower cutting portion to face each other with a substrate therebetween, and cutting the substrate.

The rotating of the upper cutting wheel fixing portion and the lower cutting wheel fixing portion may include moving the upper head portion of the upper cutting portion and the lower head portion of the lower cutting portion, disposing an upper holder and the upper holder rotation inducing a magnetic portion to face each other, and disposing a lower holder and the lower holder rotation inducing magnetic portion to face each other.

A rotation direction of the upper cutting wheel fixing portion may correspond to a rotation direction of the lower cutting wheel fixing portion.

The upper holder rotation inducing magnetic portion may include a first rotation inducing portion, a second rotation inducing portion, a third rotation inducing portion, and a fourth rotation inducing portion, and in case that the upper holder is disposed to face the first rotation inducing portion, the upper cutting wheel fixing portion of the upper holder may be rotated by a first angle, in case that the upper holder is disposed to face the second rotation inducing portion, the upper cutting wheel fixing portion may be rotated by a second angle, in case that the upper holder is disposed to face the third rotation inducing portion, the upper cutting wheel fixing portion may be rotated by a third angle, in case that the upper holder is disposed to face the fourth rotation inducing portion, the upper cutting wheel fixing portion may be rotated by a fourth angle, and the first angle, the second angle, the third angle and the fourth angle may be different from each other.

The lower holder rotation inducing magnetic portion may include a fifth rotation inducing portion, a sixth rotation inducing portion, a seventh rotation inducing portion, and an eighth rotation inducing portion, and in case that the lower holder is disposed to face the fifth rotation inducing portion, the lower cutting wheel fixing portion of the lower holder may be rotated by the first angle, in case that the lower holder is disposed to face the sixth rotation inducing portion, the lower cutting wheel fixing portion holder may be rotated by the second angle, in case that the lower holder is disposed to face the seventh rotation inducing portion, the lower cutting wheel fixing portion may be rotated by the third angle, and in case that the lower holder is disposed to face the eighth rotation inducing portion, the lower cutting wheel fixing portion may be rotated by the fourth angle.

The upper holder may further include an upper magnetic portion disposed on sides of the upper cutting wheel fixing portion. The lower holder may further include a lower magnetic portion disposed on sides of the lower cutting wheel fixing portion. While the upper holder faces the lower holder, orientations of polarities of the upper magnetic portion and the lower magnetic portion may be opposite to each other.

According to the embodiments, the substrate may be prevented from being damaged or the cutting wheel may be prevented from damaged in the process for cutting a substrate.

DETAILED DESCRIPTION OF THE EMBODIMENTS

Figure 1:
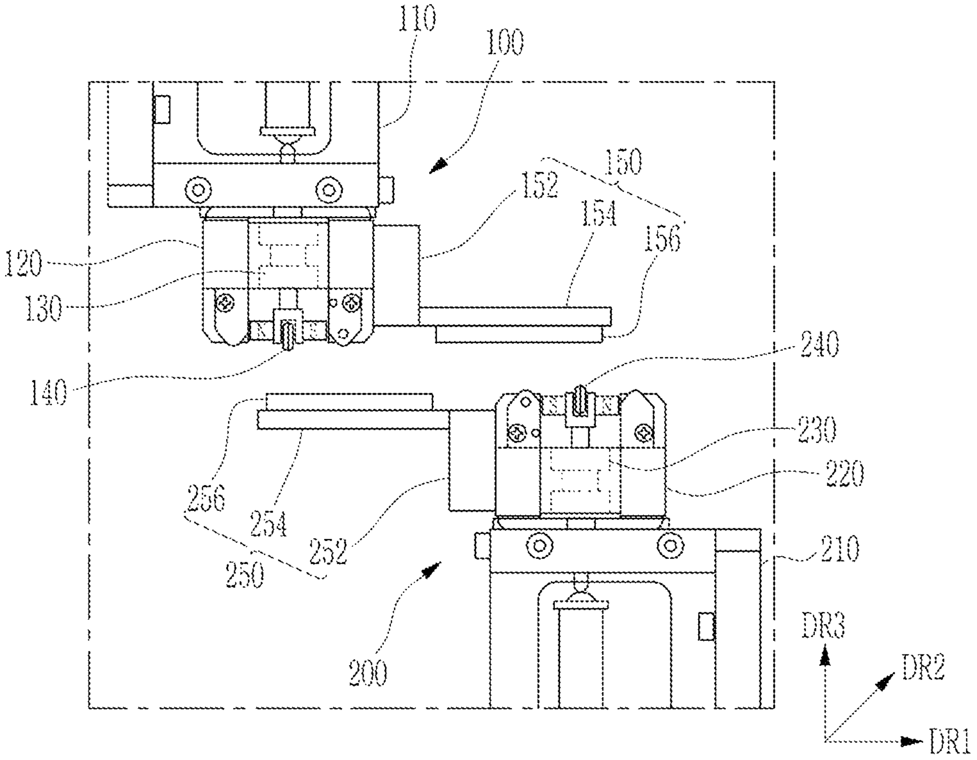
FIG. 1 shows a cutting device according to an embodiment.

The disclosure will be described more fully hereinafter with reference to the accompanying drawings, in which embodiments of the invention are shown. As those skilled in the art would realize, the described embodiments may be modified in various different ways, all without departing from the spirit or scope of the disclosure.

Parts that are irrelevant to the description will be omitted to clearly describe the disclosure, and the same elements will be designated by the same reference numerals throughout the specification.

The size and thickness of each configuration shown in the drawings are arbitrarily shown for better understanding and ease of description, but the disclosure is not limited thereto. In the drawings, the thickness of layers, films, panels, regions, etc., are enlarged for clarity. The thicknesses of some layers and areas are exaggerated for convenience of explanation.

It will be understood that in case that an element such as a layer, film, region, or substrate is referred to as being “on” another element, it can be directly on the other element or intervening elements may also be present. In contrast, in case that an element is referred to as being “directly on” another element, there are no intervening elements present. The word “on” or “above” means positioned on or below the object portion, and does not necessarily mean positioned on the upper side of the object portion based on a gravitational direction.

The spatially relative terms “under”, “below”, “beneath”, “lower”, “above”, “upper”, or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned “below” or “beneath” another device may be placed “above” another device. Accordingly, the illustrative term “below” may include both the lower and upper positions. The device may also be oriented in other directions and thus the spatially relative terms may be interpreted differently depending on the orientations.

Unless explicitly described to the contrary, the word “comprise” and variations such as “comprises” or “comprising” will be understood to imply the inclusion of stated elements but not the exclusion of any other elements.

The phrase “on a plane” means viewing the object portion from the top, and the phrase “on a cross-section” means viewing a cross-section of which the object portion is vertically cut from the side.

A cutting device according to an embodiment will now be described with reference to FIG. 1 to FIG. 9.

Figure 2:
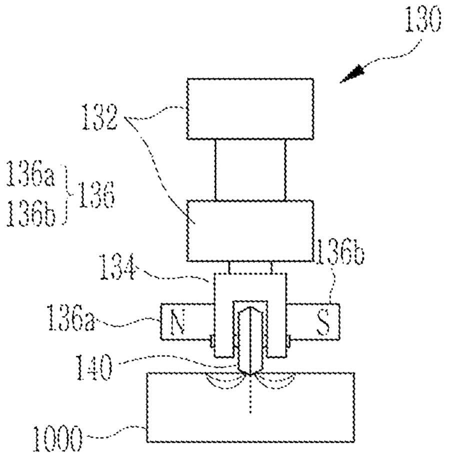
FIG. 2 shows a front view of an upper holder of a cutting device according to an embodiment.
Figure 3:
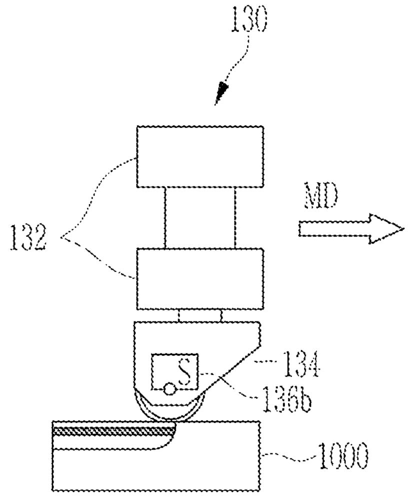
FIG. 3 shows a side view of an upper holder of a cutting device according to an embodiment.
Figure 4:
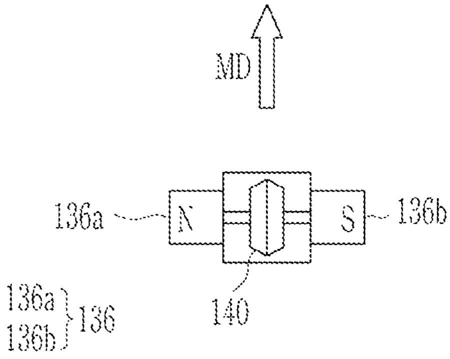
FIG. 4 shows a plan view of an upper cutting wheel and an upper magnetic portion of a cutting device according to an embodiment.
Figure 5:
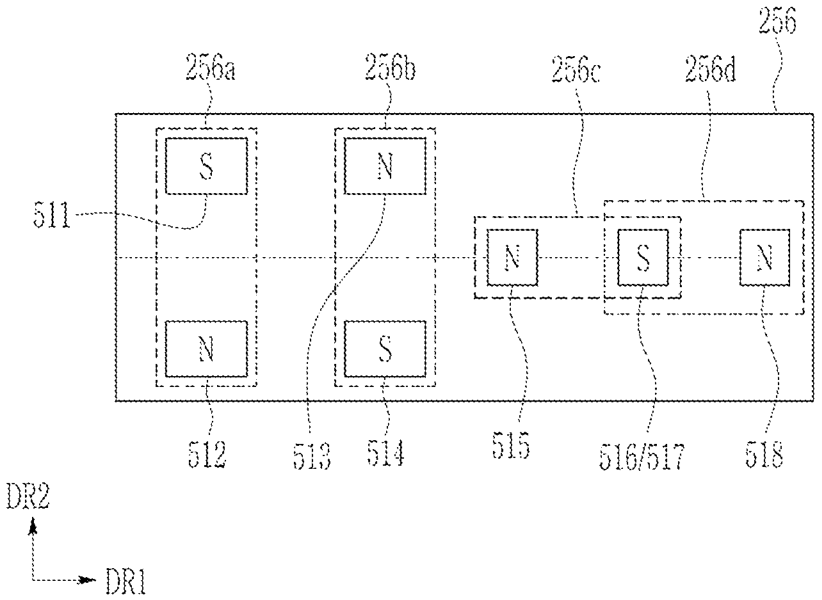
FIG. 5 shows a plan view of an upper holder rotation inducing portion of a cutting device according to an embodiment.
Figure 6:
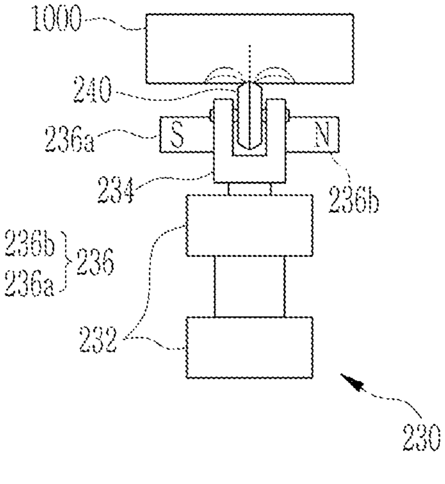
FIG. 6 shows a front view of a lower holder of a cutting device according to an embodiment.
Figure 7:
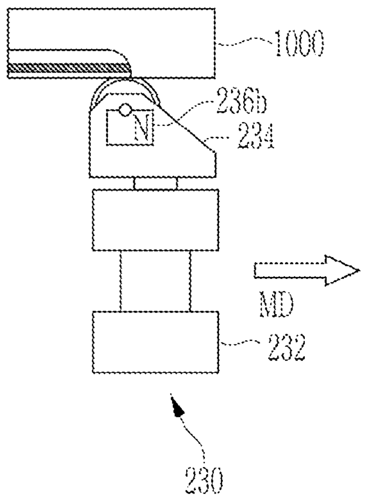
FIG. 7 shows a side view of a lower holder of a cutting device according to an embodiment.
Figure 8:
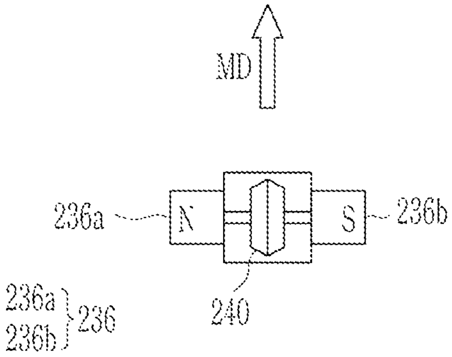
FIG. 8 shows a plan view of a lower cutting wheel and a lower magnetic portion of a cutting device according to an embodiment.
Figure 9:
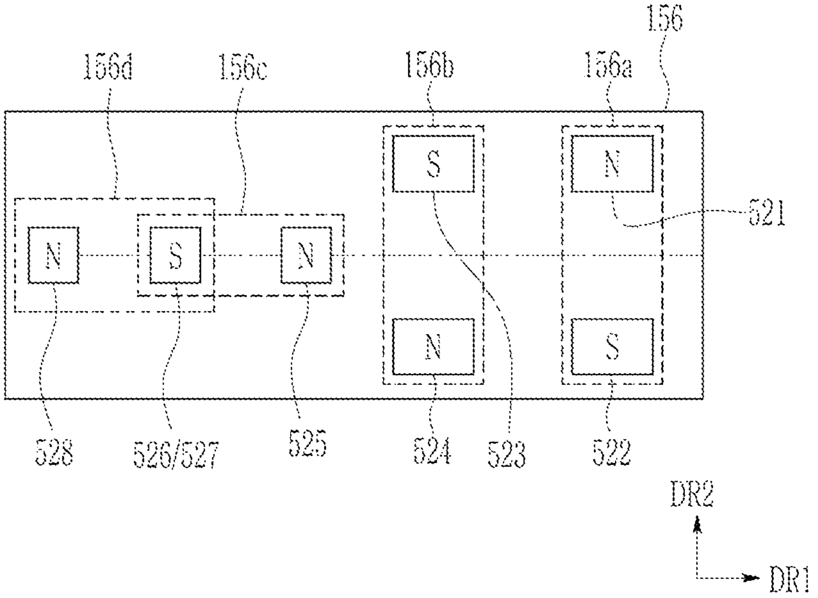
FIG. 9 shows a plan view of a lower holder rotation inducing portion of a cutting device according to an embodiment.

FIG. 1 shows a cutting device according to an embodiment. FIG. 2 shows a front view of an upper holder of a cutting device according to an embodiment, FIG. 3 shows a side view of an upper holder of a cutting device according to an embodiment, FIG. 4 shows a plan view of an upper cutting wheel and an upper magnetic portion of a cutting device according to an embodiment, and FIG. 5 shows a plan view of an upper holder rotation inducing portion of a cutting device according to an embodiment. FIG. 6 shows a front view of a lower holder of a cutting device according to an embodiment, FIG. 7 shows a side view of a lower holder of a cutting device according to an embodiment, FIG. 8 shows a plan view of a lower cutting wheel and a lower magnetic portion of a cutting device according to an embodiment, and FIG. 9 shows a plan view of a lower holder rotation inducing portion of a cutting device according to an embodiment.

As shown in FIG. 1, the cutting device may include an upper cutting portion 100 and a lower cutting portion 200. The lower cutting portion 200 may be positioned under the upper cutting portion 100. The upper cutting portion 100 and the lower cutting portion 200 may be positioned to face each other and may have a symmetric structure.

The upper cutting portion 100 may include an upper head portion 120 movable in a first direction (DR1) or a second direction (DR2), an upper holder 130 connected to the upper head portion 120, and an upper cutting wheel 140 connected to the upper holder 130. The second direction (DR2) may be perpendicular to the first direction (DR1). For example, the first direction (DR1) may be a horizontal direction, and the second direction (DR2) may be a vertical direction. The upper cutting portion 100 may be connected to the upper head portion 120, and may further include a lower holder rotation inducing portion 150 including a magnetic substance.

The upper cutting portion 100 may further include a main body portion 110, and the upper head portion 120 may be extended to the main body portion 110. The upper head portion 120 may be movable in a third direction (DR3) with respect to the main body portion 110. For example, the upper head portion 120 may be moved to a bottom side to progress the process for cutting a substrate, or the upper head portion 120 may be moved to a top side to hold the cutting process. The upper head portion 120 may move in the first direction (DR1) or the second direction (DR2) to cut a substrate.

The upper head portion 120 may have a shape surrounding the upper holder 130. A first side of the upper holder 130 may be connected to the upper head portion 120. For example, a top side of the upper holder 130 may be connected to a ceiling side of the upper head portion 120. A lateral side of the upper holder 130 may be surrounded by the upper head portion 120, and a bottom surface of the upper holder 130 may be exposed. A length of the upper head portion 120 in the third direction (DR3) may be similar to a length of the upper holder 130 in the third direction (DR3). The upper head portion 120 may protect the upper holder 130.

The upper holder 130 may, as shown in FIG. 2 to FIG. 4, include an upper body portion 132 connected to an upper head portion 120, an upper cutting wheel fixing portion 134 rotatable with respect to the upper body portion 132, and an upper magnetic portion 136 positioned on respective sides of the upper cutting wheel fixing portion 134 and including a magnetic substance.

The upper body portion 132 may have a cylindrical shape, and may be inserted into the upper head portion 120 and may be connected thereto. The upper body portion 132 may include two bearings, and the two bearings may be inserted into the upper head portion 120 and may be connected thereto.

The upper cutting wheel fixing portion 134 may be rotated with respect to the upper body portion 132. A bottom surface of the upper cutting wheel fixing portion 134 may include a concave portion, and the upper cutting wheel 140 may be positioned in the concave portion. A direction of the upper cutting wheel 140 may be determined by the rotation direction of the upper cutting wheel fixing portion 134. For example, the cutting direction may be determined by the direction of the upper cutting wheel fixing portion 134.

The upper magnetic portion 136 may include a first magnetic substance 136*a* positioned on a first side of the upper cutting wheel fixing portion 134, and a second magnetic substance 136*b* positioned on a second side of the upper cutting wheel fixing portion 134. The first magnetic substance 136*a* may face the second magnetic substance 136*b* with the upper cutting wheel fixing portion 134 therebetween. The first magnetic substance 136*a* and the second magnetic substance 136*b* may have opposite polarities. For example, in case that the first magnetic substance 136*a* has N-polarity, the second magnetic substance 136*b* may have S-polarity. The polarities of the first magnetic substance 136*a* and the second magnetic substance 136*b* may mean polarities of bottom surfaces of the first magnetic substance 136*a* and the second magnetic substance 136*b*. The upper magnetic portion 136 may face the lower cutting portion 200. A side where the first magnetic substance 136*a* of the upper magnetic portion 136 faces the lower cutting portion 200 may have N-polarity. A side where the second magnetic substance 136*b* of the upper magnetic portion 136 faces the lower cutting portion 200 may have S-polarity.

The upper cutting wheel 140 may be connected to the upper cutting wheel fixing portion 134 of the upper holder 130. The upper cutting wheel fixing portion 134 may have a shape surrounding respective sides of the upper cutting wheel 140. The upper cutting wheel 140 may have a circular shape, and may be rotated with respect to a rotation axis positioned on a center of the circle. A member penetrating the center of the upper cutting wheel 140 may be put into the upper cutting wheel fixing portion 134, and the upper cutting wheel 140 may be connected.

The upper cutting wheel 140 may rotate while the upper head portion 120 moves. While the upper cutting wheel 140 contacts a first side of the substrate 1000, the upper cutting wheel 140 may rotate and may cut the substrate 1000. The rotation axis of the upper cutting wheel 140 may be not positioned on a fixation axis of the upper body portion 132. The rotation axis of the upper cutting wheel 140 may be spaced in an opposite direction of the moving direction (MD) of the upper head portion 120 from the fixation axis of the upper body portion 132.

The upper magnetic portion 136 may be positioned on both sides of the upper cutting wheel 140. The first magnetic substance 136*a* may be positioned on a left of the upper cutting wheel 140 with respect to the moving direction (MD) of the upper head portion 120. The upper cutting wheel fixing portion 134 may be positioned between the first magnetic substance 136*a* and the upper cutting wheel 140. The first magnetic substance 136*a* may have N-polarity. The second magnetic substance 136*b* may be positioned on a right of the upper cutting wheel 140 with respect to the moving direction (MD) of the upper head portion 120. The upper cutting wheel fixing portion 134 may be positioned between the second magnetic substance 136*b* and the upper cutting wheel 140. The second magnetic substance 136*b* may have different polarity from the first magnetic substance 136*a*, and may have S-polarity.

The lower cutting portion 200 may include a lower head portion 220 movable in the first direction (DR1) or the second direction (DR2), a lower holder 230 connected to the lower head portion 220, and a lower cutting wheel 240 connected to the lower holder 230. The lower cutting portion 200 may be connected to the lower head portion 220, and may further include an upper holder rotation inducing portion 250 including a magnetic substance.

The upper holder rotation inducing portion 250 may include a lower cylinder 252 connected to a first side of the lower head portion 220, a lower stage 254 movable in the third direction (DR3) that is perpendicular to the first direction (DR1) and the second direction (DR2) by the lower cylinder 252, and an upper holder rotation inducing magnetic portion 256 positioned on the lower stage 254.

The lower cylinder 252 may move the lower stage 254 to a top side or a bottom side. For example, in case that the process for cutting a substrate is performed, the lower stage 254 may be moved to the bottom side so that it may be further from the upper cutting portion 100. In case that a rotation of the upper cutting wheel 140 is induced, the lower stage 254 is moved to the top side so that it may be closer to the upper cutting portion 100.

As shown in FIG. 5, the upper holder rotation inducing magnetic portion 256 may include a first rotation inducing portion 256*a*, a second rotation inducing portion 256*b*, a third rotation inducing portion 256*c*, and a fourth rotation inducing portion 256*d* sequentially positioned in the first direction (DR1). For example, the first rotation inducing portion 256*a* may be positioned on a leftmost side, and the second rotation inducing portion 256*b* may be positioned on a right side of the first rotation inducing portion 256*a*. A third rotation inducing portion 256*c* may be positioned on a right side of the second rotation inducing portion 256*b*, and a fourth rotation inducing portion 256*d* may be positioned on a right side of the third rotation inducing portion 256*c*. The first rotation inducing portion 256*a*, the second rotation inducing portion 256*b*, the third rotation inducing portion 256*c*, and the fourth rotation inducing portion 256*d* may respectively include multiple magnetic substances.

The first rotation inducing portion 256*a* may include an S-polarity magnetic substance 511 and an N-polarity magnetic substance 512 disposed in the second direction (DR2). In a plan view, the S-polarity magnetic substance 511 of the first rotation inducing portion 256*a* may be positioned on the top side, and the N-polarity magnetic substance 512 may be positioned on the bottom side. The second rotation inducing portion 256*b* may include an N-polarity magnetic substance 513 and an S-polarity magnetic substance 514 disposed in the second direction (DR2). In a plan view, the N-polarity magnetic substance 513 of the second rotation inducing portion 256*b* may be positioned on the top side, and the S-polarity magnetic substance 514 may be positioned on the bottom side. Therefore, an orientation of the S-polarity magnetic substance 511 and the N-polarity magnetic substance 512 of the first rotation inducing portion 256*a* and an orientation of the S-polarity magnetic substance 514 and the N-polarity magnetic substance 513 of the second rotation inducing portion 256*b* may be opposite.

The third rotation inducing portion 256*c* may include an N-polarity magnetic substance 515 and an S-polarity magnetic substance 516 disposed in the first direction (DR1). In a plan view, the N-polarity magnetic substance 515 of the third rotation inducing portion 256*c* may be positioned on the left, and the S-polarity magnetic substance 516 may be positioned on the right. The fourth rotation inducing portion 256*d* may include an S-polarity magnetic substance 517 and an N-polarity magnetic substance 518 disposed in the first direction (DR1). In a plan view, the S-polarity magnetic substance 517 of the fourth rotation inducing portion 256*d* may be positioned on the left, and the N-polarity magnetic substance 518 may be positioned on the right. Therefore, an orientation of the S-polarity magnetic substance 516 and the N-polarity magnetic substance 515 of the third rotation inducing portion 256*c*, and an orientation of the S-polarity magnetic substance 517 and the N-polarity magnetic substance 518 of the fourth rotation inducing portion 256*d*, may be opposite. Further, the S-polarity magnetic substance 516 of the third rotation inducing portion 256*c* and the S-polarity magnetic substance 517 of the fourth rotation inducing portion 256*d* may be integral with each other.

The polarities of the respective magnetic substances of the first rotation inducing portion 256*a*, the second rotation inducing portion 256*b*, the third rotation inducing portion 256*c*, and the fourth rotation inducing portion 256*d* may mean polarities on the top sides of the respective magnetic substances. The upper holder rotation inducing magnetic portion 256 may face the upper cutting portion 100. The polarities of the respective magnetic substances of the upper holder rotation inducing magnetic portion 256 may mean the polarities of the sides facing the upper cutting portion 100.

To induce a rotation of the upper holder 130, the upper holder 130 may be positioned above the upper holder rotation inducing magnetic portion 256. The upper magnetic portion 136 of the upper holder 130 may be positioned to face at least one of the first rotation inducing portion 256*a*, the second rotation inducing portion 256*b*, the third rotation inducing portion 256*c*, and the fourth rotation inducing portion 256*d*. For example, the upper magnetic portion 136 may overlap a space between the S-polarity magnetic substance 511 and the N-polarity magnetic substance 512 of the first rotation inducing portion 256*a*. The upper magnetic portion 136 may overlap a space between the N-polarity magnetic substance 513 and the S-polarity magnetic substance 514 of the second rotation inducing portion 256*b*. The upper magnetic portion 136 may overlap a space between the N-polarity magnetic substance 515 and the S-polarity magnetic substance 516 of the third rotation inducing portion 256*c*. The upper magnetic portion 136 may overlap a space between the S-polarity magnetic substance 517 and the N-polarity magnetic substance 518 of the fourth rotation inducing portion 256*d*. A rotation angle of the upper holder 130 may vary according to an overlapping position of the upper magnetic portion 136 and the upper holder rotation inducing magnetic portion 256. Accordingly, a direction of the upper cutting wheel 140 may be changed.

The lower cutting portion 200 may include a main body portion 210, and the lower head portion 220 may be extended to the main body portion 210. The lower head portion 220 may be movable in the third direction (DR3) with respect to the main body portion 210. For example, the lower head portion 220 may be moved to the top side to progress the process for cutting a substrate, or the lower head portion 220 may be moved to the bottom side to hole the cutting process. The lower head portion 220 may be moved in the first direction (DR1) or the second direction (DR2) to cut a substrate.

The lower head portion 220 may have a shape surrounding the lower holder 230. A first side of the lower holder 230 may be connected to the lower head portion 220. For example, a bottom side of the lower holder 230 may be connected to the bottom side of the lower head portion 220. A lateral side of the lower holder 230 may be surrounded by the lower head portion 220, and a top side of the lower holder 230 may be exposed. A length of the lower head portion 220 in the third direction (DR3) may be similar to a length of the lower holder 230 in the third direction (DR3). The lower head portion 220 may protect the lower holder 230.

As shown in FIG. 6 to FIG. 8, the lower holder 230 may include a lower body portion 232 connected to the lower head portion 220, a lower cutting wheel fixing portion 234 that is rotatable with respect to the lower body portion 232, and a lower magnetic portion 236 positioned on respective sides of the lower cutting wheel fixing portion 234 and including a magnetic substance.

The lower body portion 232 may have a cylindrical shape, and it may be inserted into the lower head portion 220 and may be connected thereto. The lower body portion 232 may include two bearings, and the two bearings may be inserted into the lower head portion 220 and may be connected.

The lower cutting wheel fixing portion 234 may be rotatable with respect to the lower body portion 232. A top side of the lower cutting wheel fixing portion 234 may include a concave portion, and the lower cutting wheel 240 may be positioned in the concave portion. The direction of the lower cutting wheel 240 may be determined by the rotation direction of the lower cutting wheel fixing portion 234. For example, the cutting direction may be determined by the direction of the lower cutting wheel fixing portion 234.

The lower magnetic portion 236 may include a third magnetic substance 236*a* positioned on a first side of the lower cutting wheel fixing portion 234, and a fourth magnetic substance 236*b* positioned on a second side of the lower cutting wheel fixing portion 234. The third magnetic substance 236*a* may face the fourth magnetic substance 236*b* with the lower cutting wheel fixing portion 234 therebetween. The third magnetic substance 236*a* and the fourth magnetic substance 236*b* may have opposite polarities. For example, in case that the third magnetic substance 236*a* may have S-polarity, the fourth magnetic substance 236*b* may have N-polarity. The polarities of the third magnetic substance 236*a* and the fourth magnetic substance 236*b* may mean polarities at the top sides of the third magnetic substance 236*a* and the fourth magnetic substance 236*b*. The lower magnetic portion 236 may face the upper cutting portion 100. The side where the third magnetic substance 236*a* of the lower magnetic portion 236 faces the upper cutting portion 100 may have S-polarity. The side where the fourth magnetic substance 236*d* of the lower magnetic portion 236 faces the upper cutting portion 100 may have N-polarity.

The polarity of the first magnetic substance 136*a* may be opposite to the polarity of the third magnetic substance 236*a*. The polarity of the second magnetic substance 136*b* may be opposite to the polarity of the fourth magnetic substance 236*b*. Hence, the polarity of the first magnetic substance 136*a* may correspond to the polarity of the fourth magnetic substance 236*b*. The polarity of the second magnetic substance 136*b* may correspond to the polarity of the third magnetic substance 236*a*.

The lower cutting wheel 240 may be connected to the lower cutting wheel fixing portion 234 of the lower holder 230. The lower cutting wheel fixing portion 234 may have a shape surrounding respective sides of the lower cutting wheel 240. The lower cutting wheel 240 may have a circular shape, and may be rotated with respect to a rotation axis positioned on a center of the circle. A member penetrating the center of the lower cutting wheel 240 may be put into the lower cutting wheel fixing portion 234, and the lower cutting wheel 240 may be connected.

The lower cutting wheel 240 may rotate while the lower head portion 220 moves. While the lower cutting wheel 240 contacts a second side of the substrate 1000, the lower cutting wheel 240 may rotate and may cut the substrate 1000. The upper cutting wheel 140 may be positioned on the top side of the substrate 1000, and the lower cutting wheel 240 may be positioned on the bottom side of the substrate 1000. The substrate 1000 may be made by bonding two sheets of substrates. Multiple elements for displaying images may be positioned between the two sheets of substrates. For example, the substrate 1000 may be a mother board for the liquid crystal display or the organic light emitting device. The upper cutting wheel 140 may cut the upper substrate, and the lower cutting wheel 240 may cut the lower substrate. The rotation axis of the lower cutting wheel 240 may be not positioned on the fixation axis of the lower body portion 232. The rotation axis of the lower cutting wheel 240 may be spaced in the opposite direction of the moving direction (MD) of the lower head portion 220 from the fixation axis of the lower body portion 232. The upper head portion 120 and the lower head portion 220 may be simultaneously moved in the same direction and the cutting process may be performed.

The lower magnetic portion 236 may be positioned on both sides of the lower cutting wheel 240. The third magnetic substance 236*a* may be positioned on the left side of the lower cutting wheel 240 with reference to the moving direction (MD) of the lower head portion 220. The lower cutting wheel fixing portion 234 may be positioned between the third magnetic substance 236*a* and the lower cutting wheel 240. The third magnetic substance 236*a* may have S-polarity. The fourth magnetic substance 236*b* may be positioned on the right side of the lower cutting wheel 240 with reference to the moving direction (MD) of the lower head portion 220. The lower cutting wheel fixing portion 234 may be positioned between the fourth magnetic substance 236*b* and the lower cutting wheel 240. The fourth magnetic substance 236*b* may have opposite polarity to the third magnetic substance 236*a*, and may have N-polarity.

The lower holder rotation inducing portion 150 of the upper cutting portion 100 may include an upper cylinder 152 connected to the first side of the upper head portion 120, an upper stage 154 movable in the third direction (DR3) that is perpendicular to the first direction (DR1) and the second direction (DR2) by the upper cylinder 152, and a lower holder rotation inducing magnetic portion 156 positioned below the upper stage 154.

In case that the upper cylinder 152 is connected to the right side of the upper head portion 120, the lower cylinder 252 may be connected to the left side of the lower head portion 220. On the contrary, in case that the upper cylinder 152 is connected to the left side of the upper head portion 120, the lower cylinder 252 may be connected to the right side of the lower head portion 220. Hence, in case that the upper head portion 120 faces the upper holder rotation inducing portion 250, the lower head portion 220 may face the lower holder rotation inducing portion 150. The upper head portion 120 may face the lower head portion 220 while the cutting process is progressed. The upper holder rotation inducing portion 250 may not face the lower holder rotation inducing portion 150.

The upper cylinder 152 may move the upper stage 154 to the top side or the bottom side. For example, in case that the process for cutting a substrate is progressed, the upper stage 154 may be moved to the top side and may be further from the lower cutting portion 200. Further, in case that the lower cutting wheel 240 is induced to be rotated, the upper stage 154 may be moved to the bottom side and may be closer to the lower cutting portion 200.

As shown in FIG. 9, the lower holder rotation inducing magnetic portion 156 may include a fifth rotation inducing portion 156*a*, a sixth rotation inducing portion 156*b*, a seventh rotation inducing portion 156*c*, and an eighth rotation inducing portion 156*d* sequentially positioned in the first direction (DR1). For example, the fifth rotation inducing portion 156*a* may be positioned on a rightmost side, and the sixth rotation inducing portion 156*b* may be positioned on the left side of the fifth rotation inducing portion 156*a*. The seventh rotation inducing portion 156*c* may be positioned on the left side of the sixth rotation inducing portion 156*b*, and the eighth rotation inducing portion 156*d* may be positioned on the left side of the seventh rotation inducing portion 156*c*. The fifth rotation inducing portion 156*a*, the sixth rotation inducing portion 156*b*, the seventh rotation inducing portion 156*c*, and the eighth rotation inducing portion 156*d* may respectively include multiple magnetic substances.

The fifth rotation inducing portion 156*a* may include an N-polarity magnetic substance 521 and an S-polarity magnetic substance 522 disposed in the second direction (DR2). In a plan view, the N-polarity magnetic substance 521 of the fifth rotation inducing portion 156*a* may be positioned on the top side, and the S-polarity magnetic substance 522 may be positioned on the bottom side. The sixth rotation inducing portion 156*b* may include an S-polarity magnetic substance 523 and an N-polarity magnetic substance 524 disposed in the second direction (DR2). The S-polarity magnetic substance 523 of the sixth rotation inducing portion 156*b* may be positioned on the top side, and the N-polarity magnetic substance 524 may be positioned on the bottom side. Therefore, an orientation of the N-polarity magnetic substance 521 and the S-polarity magnetic substance 522 of the fifth rotation inducing portion 156*a* may be opposite to an orientation of the S-polarity magnetic substance 523 and the N-polarity magnetic substance 524 of the sixth rotation inducing portion 156*b*.

The seventh rotation inducing portion 156*c* may include an N-polarity magnetic substance 525 and an S-polarity magnetic substance 526 disposed in the first direction (DR1). In a plan view, the N-polarity magnetic substance 525 of the seventh rotation inducing portion 156*c* may be positioned on the right side, and the S-polarity magnetic substance 526 may be positioned on the left side. The eighth rotation inducing portion 156*d* may include an S-polarity magnetic substance 527 and an N-polarity magnetic substance 528 disposed in the first direction (DR1). The S-polarity magnetic substance 527 of the eighth rotation inducing portion 156*d* may be positioned on the right side, and the N-polarity magnetic substance 528 may be positioned on the left side. Therefore, an orientation of the N-polarity magnetic substance 525 and the S-polarity magnetic substance 526 of the seventh rotation inducing portion 156*c* may be opposite to an orientation of the S-polarity magnetic substance 527 and the N-polarity magnetic substance 528 of the eighth rotation inducing portion 156*d*. The S-polarity magnetic substance 526 of the seventh rotation inducing portion 156*c* and the S-polarity magnetic substance 527 of the eighth rotation inducing portion 156*d* may be integral with each other.

The polarities of the respective magnetic substance of the fifth rotation inducing portion 156*a*, the sixth rotation inducing portion 156*b*, the seventh rotation inducing portion 156*c*, and the eighth rotation inducing portion 156*d* may mean the polarities of the bottom surfaces of the respective magnetic substances. The lower holder rotation inducing magnetic portion 156 may face the lower cutting portion 200. The polarities of the respective magnetic substance of the lower holder rotation inducing magnetic portion 156 may mean the polarities of the sides that face the lower cutting portion 200.

To induce the rotation of the lower holder 230, the lower holder 230 may be positioned below the lower holder rotation inducing magnetic portion 156. The lower magnetic portion 236 of the lower holder 230 may be positioned to face at least one of the fifth rotation inducing portion 156*a*, the sixth rotation inducing portion 156*b*, the seventh rotation inducing portion 156*c*, and the eighth rotation inducing portion 156*d*. For example, the lower magnetic portion 236 may overlap a space between the N-polarity magnetic substance 521 and the S-polarity magnetic substance 522 of the fifth rotation inducing portion 156*a*. The lower magnetic portion 236 may overlap a space between the S-polarity magnetic substance 523 and the N-polarity magnetic substance 524 of the sixth rotation inducing portion 156*b*. The lower magnetic portion 236 may overlap a space between the N-polarity magnetic substance 525 and the S-polarity magnetic substance 526 of the seventh rotation inducing portion 156*c*. The lower magnetic portion 236 may overlap a space between the S-polarity magnetic substance 527 and the N-polarity magnetic substance 528 of the eighth rotation inducing portion 156*d*. The rotation angle of the lower holder 230 may be changed according to the overlapping position of the lower magnetic portion 236 and the lower holder rotation inducing magnetic portion 156. Accordingly, the direction of the lower cutting wheel 240 may be changed.

A substrate cutting method according to an embodiment will now be described with reference to FIG. 10 to FIG. 18.

Figure 10:
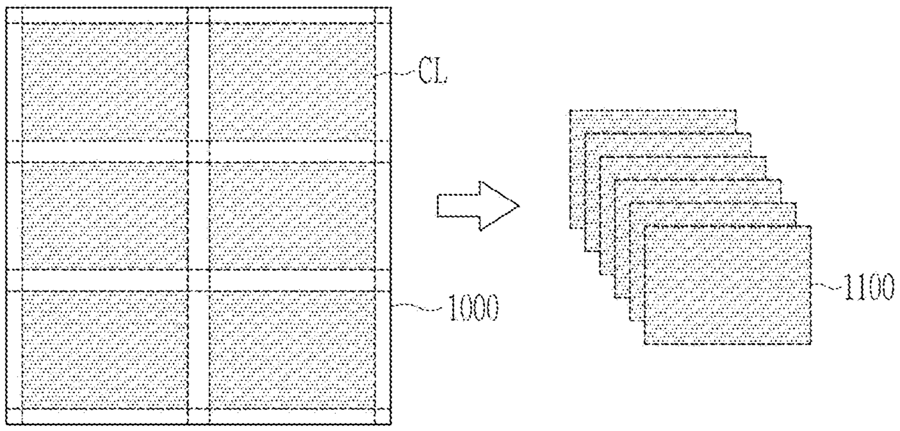
FIG. 10 shows a unit substrate cut by a substrate cutting method according to an embodiment.
Figure 11:
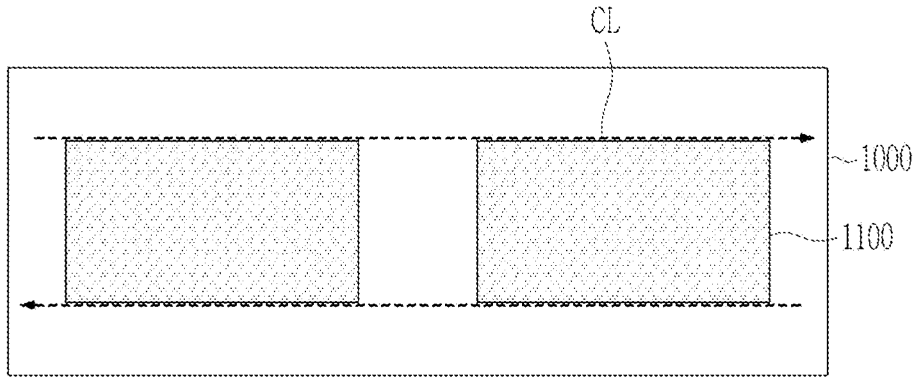
FIG. 11 shows a cutting direction by a substrate cutting method according to an embodiment.

FIG. 10 shows a unit substrate cut by a substrate cutting method according to an embodiment, and FIG. 11 shows a cutting direction by a substrate cutting method according to an embodiment. FIG. 12 to FIG. 18 sequentially show a substrate cutting method according to an embodiment.

As shown in FIG. 10, a substrate 1000 may be cut by using a cutting device according to an embodiment. Regarding the substrate 1000, a lower substrate and an upper substrate may be bonded to face each other. Elements may be positioned on the lower substrate and the upper substrate. For example, multiple elements may be positioned between the lower substrate and the upper substrate.

The substrate 1000 may be cut along a cutting line (CL) into multiple unit substrates 1100. The respective unit substrates 1100 may have a same size. Without being limited thereto, at least some of the unit substrates 1100 may have different sizes. Accordingly, designing of the cutting line (CL) may become different.

As shown in FIG. 11, the cutting device may move along the left edge and the right edge of the substrate 1000 back and forth and may cut the substrate 1000. The cutting device may be positioned on the left edge of the top side of the substrate 1000, and the substrate 1000 may be cut by moving the cutting device to the right edge from the left edge. A conveyor belt on which the substrate 1000 is disposed may be moved, and a cutting wheel of the cutting device is rotated. The cutting device may be positioned on the right edge positioned below the top side of the substrate 1000, and the substrate 1000 may be cut by moving the cutting device to the left edge from the right edge. After completing the cutting in a horizontal direction while repeating the above-noted process, the cutting wheel may be rotated to perform the cutting in the vertical direction. In case that the cutting device moves along the upper edge and the lower edge of the substrate 1000 back and forth and cuts the substrate 1000 to finish the cutting in the vertical direction, it may be separated into multiple unit substrates.

A process for rotating a cutting wheel of a cutting device will now be described in detail.

Figure 12:
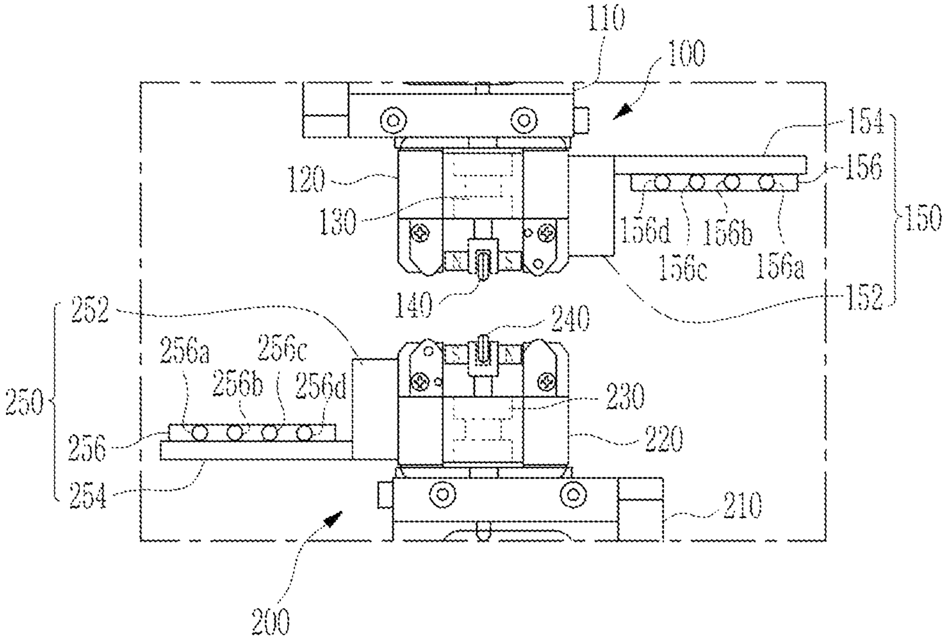
FIG. 12 to FIG. 18 sequentially show a substrate cutting method according to an embodiment.

As shown in FIG. 12, the upper cutting portion 100 and the lower cutting portion 200 may be positioned to face each other, and the substrate may be cut. Although not shown in the drawing, the substrate may be positioned between the upper cutting portion 100 and the lower cutting portion 200. The upper head portion 120 of the upper cutting portion 100 may face the lower head portion 220 of the lower cutting portion 200. The upper cutting wheel 140 of the upper cutting portion 100 may face the lower cutting wheel 240 of the lower cutting portion 200. For example, the upper cutting wheel 140 and the lower cutting wheel 240 may overlap each other with the substrate therebetween, and the cutting process may be progressed by pressurizing the same position of the substrate. The upper magnetic portion 136 may be positioned on both sides of the upper cutting wheel fixing portion 134, and the lower magnetic portion 236 may be positioned on both sides of the lower cutting wheel fixing portion 234. While the upper holder 130 faces the lower holder 230, orientations of the polarities of the upper magnetic portion 136 and the lower magnetic portion 236 may be opposite to each other. While the upper cutting wheel 140 and the lower cutting wheel 240 overlap each other, the first magnetic substance 136*a* of the upper magnetic portion 136 may overlap the third magnetic substance 236*a* of the lower magnetic portion 236. The first magnetic substance 136*a* may have N-polarity, and the third magnetic substance 236*a* may have S-polarity. While the upper cutting wheel 140 overlaps the lower cutting wheel 240, the second magnetic substance 136*b* of the upper magnetic portion 136 may overlap the fourth magnetic substance 236*b* of the lower magnetic portion 236. Here, the second magnetic substance 136*b* may have S-polarity, and the fourth magnetic substance 236*b* may have N-polarity.

The lower holder rotation inducing portion 150 may not overlap the upper holder rotation inducing portion 250. The lower holder rotation inducing magnetic portion 156 of the lower holder rotation inducing portion 150 may be moved to the top side, and the upper holder rotation inducing magnetic portion 256 of the upper holder rotation inducing portion 250 may be moved to the bottom side.

Figure 13:
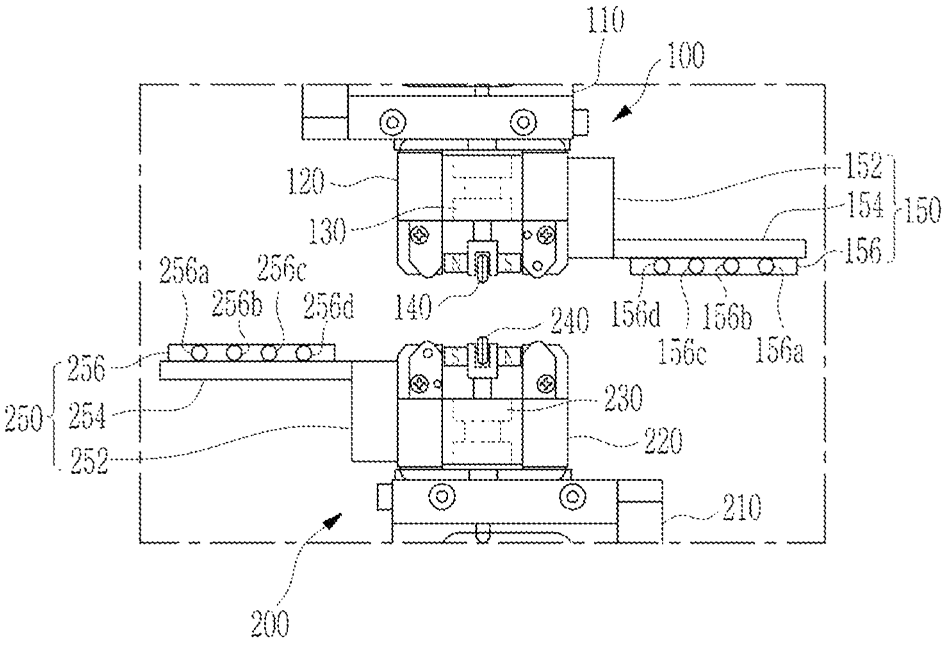

As shown in FIG. 13, the lower holder rotation inducing magnetic portion 156 of the upper cutting portion 100 may be moved to the bottom side, and the upper holder rotation inducing magnetic portion 256 of the lower cutting portion 200 may be moved to the top side. By moving the upper stage 154 to the bottom side by the upper cylinder 152, the lower holder rotation inducing magnetic portion 156 may be moved to the bottom side. Accordingly, a distance between the lower holder rotation inducing magnetic portion 156 and the lower cutting portion 200 may be reduced. By moving the lower stage 254 to the top side by the lower cylinder 252, the upper holder rotation inducing magnetic portion 256 may be moved to the top side. Accordingly, a distance between the upper holder rotation inducing magnetic portion 256 and the upper cutting portion 100 may be reduced.

Figure 14:
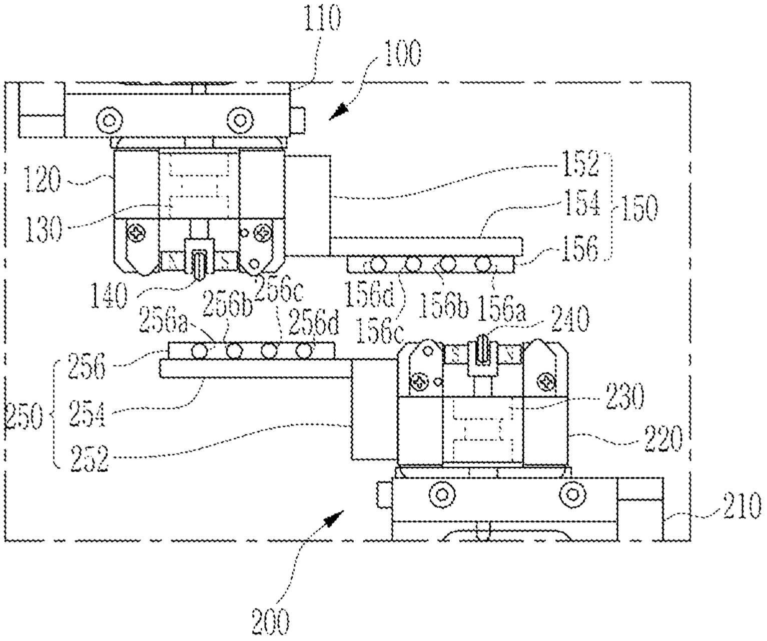

As shown in FIG. 14, by moving the upper head portion 120 of the upper cutting portion 100 and the lower head portion 220 of the lower cutting portion 200, the upper holder 130 of the upper cutting portion 100 and the lower holder 230 of the lower cutting portion 200 may be rotated.

Figure 15:
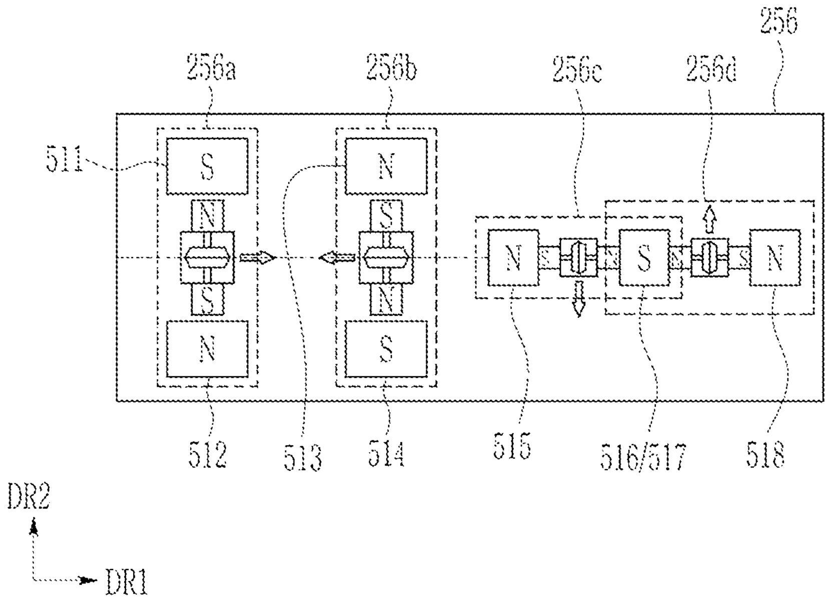
Figure 16:
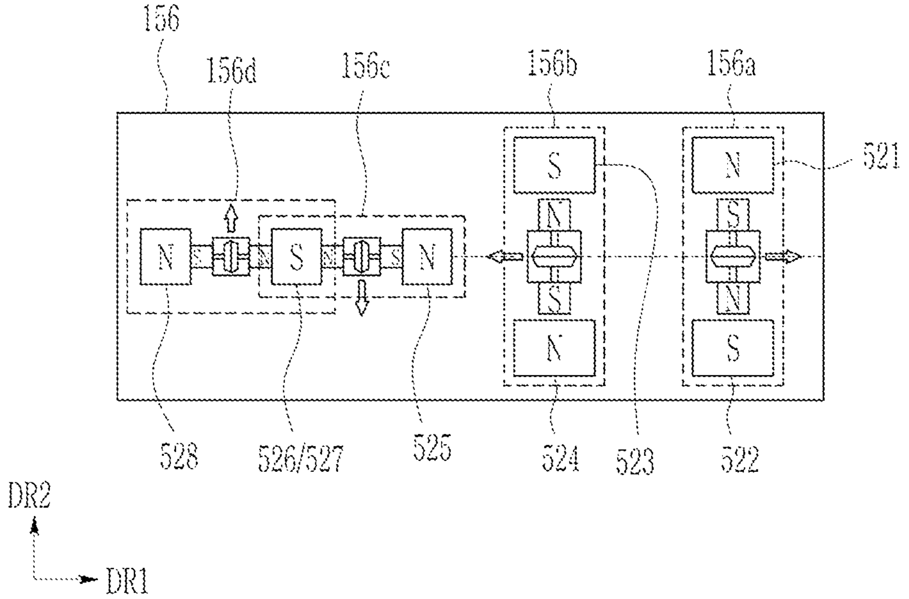

By moving the upper head portion 120 of the upper cutting portion 100 and the lower head portion 220 of the lower cutting portion 200, the upper holder 130 and the upper holder rotation inducing magnetic portion 256 may be positioned to face each other, and the lower holder 230 and the lower holder rotation inducing magnetic portion 156 may be positioned to face each other. FIG. 15 shows four cases where the upper holder 130 overlaps the upper holder rotation inducing magnetic portion 256 with respect to overlapping positions. FIG. 16 shows four cases where the lower holder 230 overlaps the lower holder rotation inducing magnetic portion 156 with respect to overlapping positions.

As shown in FIG. 15, in case that the upper holder 130 is positioned to face the first rotation inducing portion **256*a* of the upper holder rotation inducing magnetic portion 256, the upper cutting wheel fixing portion 134 of the upper holder 130 may be rotated by a first angle. The upper magnetic portion 136 may be positioned to align with the S-polarity magnetic substance 511 and the N-polarity magnetic substance 512 of the first rotation inducing portion 256*a*. The upper cutting wheel fixing portion 134** may be rotated by about 90 degrees in a clockwise direction.

In case that the upper holder 130 faces the second rotation inducing portion **256*b*, the upper cutting wheel fixing portion 134 may be rotated by a second angle. The upper magnetic portion 136 may be positioned to align with the N-polarity magnetic substance 513 and the S-polarity magnetic substance 514 of the second rotation inducing portion 256*b*. The upper cutting wheel fixing portion 134** may be rotated by about 270 degrees in the clockwise direction.

In case that the upper holder 130 is positioned to face the third rotation inducing portion **256*c*, the upper cutting wheel fixing portion 134 may be rotated by a third angle. The upper magnetic portion 136 may be positioned to align with the N-polarity magnetic substance 515 and the S-polarity magnetic substance 516 of the third rotation inducing portion 256*c*. The upper cutting wheel fixing portion 134** may be rotated by about 180 degrees.

In case that the upper holder 130 faces the fourth rotation inducing portion **256*d*, the upper cutting wheel fixing portion 134 may be rotated by a fourth angle. The upper magnetic portion 136 may be positioned to align with the S-polarity magnetic substance 517 and the N-polarity magnetic substance 518 of the fourth rotation inducing portion 256*d*. The upper cutting wheel fixing portion 134 may be rotated by about 0 degrees. For example, the arranging direction of the upper cutting wheel fixing portion 134** may be maintained.

Rotation angles of the upper cutting wheel fixing portion 134 with respect to the position of the upper holder 130 may be different. For example, the first angle, the second angle, the third angle, and the fourth angle may be different from each other. As described, the moving direction of the upper head portion 120 may be changed by the rotation of the upper holder 130, and the cutting direction of the substrate may be changed without an additional space for a wheel turn.

As shown in FIG. 16, in case that the lower holder 230 is positioned to face the fifth rotation inducing portion **156*a* of the lower holder rotation inducing magnetic portion 156, the lower cutting wheel fixing portion 234 of the lower holder 230 may be rotated by a first angle. The lower magnetic portion 236 may be positioned to align with the N-polarity magnetic substance 521 and the S-polarity magnetic substance 522 of the fifth rotation inducing portion 156*a*. The lower cutting wheel fixing portion 234** may be rotated by about 90 degrees in the clockwise direction.

In case that the lower holder 230 is positioned to face the sixth rotation inducing portion **156*b*, the lower cutting wheel fixing portion 234 may be rotated by a second angle. The lower magnetic portion 236 may be positioned to align with the S-polarity magnetic substance 523 and the N-polarity magnetic substance 524 of the sixth rotation inducing portion 156*b*. The lower cutting wheel fixing portion 234** may be rotated by about 270 degrees in the clockwise direction.

In case that the lower holder 230 is positioned to face the seventh rotation inducing portion **156*c*, the lower cutting wheel fixing portion 234 may be rotated by a third angle. The lower magnetic portion 236 may be positioned to align with the N-polarity magnetic substance 525 and the S-polarity magnetic substance 526 of the seventh rotation inducing portion 156*c*. The lower cutting wheel fixing portion 234** may be rotated by about 180 degrees.

In case that the lower holder 230 faces the eighth rotation inducing portion **156*d*, the lower cutting wheel fixing portion 234 may be rotated by about a fourth angle. The lower magnetic portion 236 may be positioned to align with the S-polarity magnetic substance 527 and the N-polarity magnetic substance 528 of the eighth rotation inducing portion 156*d*. The lower cutting wheel fixing portion 234 may be rotated by about 0 degrees. For example, the arranging direction of the lower cutting wheel fixing portion 234** may be maintained.

The rotation angle of the upper cutting wheel fixing portion 234 according to the position of the lower holder 230 may be different. For example, the first angle, the second angle, the third angle, and the fourth angle may be different from each other. As described, the moving direction of the lower head portion 220 may be changed by the rotation of the lower holder 230, and the cutting direction of the substrate may be changed without an additional space for a wheel turn.

The rotation angle of the upper holder 130 and the rotation angle of the lower holder 230 may be identically controlled. In case that the upper holder 130 is positioned to face the first rotation inducing portion **256*a*, the lower holder 230 may be positioned to face the fifth rotation inducing portion 156*a*, and the upper holder 130 and the lower holder 230 may be rotated by a first angle. In case that the upper holder 130 is positioned to face the second rotation inducing portion 256*b*, the lower holder 230 is positioned to face the sixth rotation inducing portion 156*b*, and the upper holder 130 and the lower holder 230 may be rotated by a second angle. In case that the upper holder 130 is positioned to face the third rotation inducing portion 256*c*, the lower holder 230 may be positioned to face the seventh rotation inducing portion 156*c*, and the upper holder 130 and the lower holder 230 may be rotated by a third angle. In case that the upper holder 130 is positioned to face the fourth rotation inducing portion 256*d*, the lower holder 230 may be positioned to face the eighth rotation inducing portion 156*d*, and the upper holder 130 and the lower holder 230** may be rotated by a fourth angle.

Figure 17:
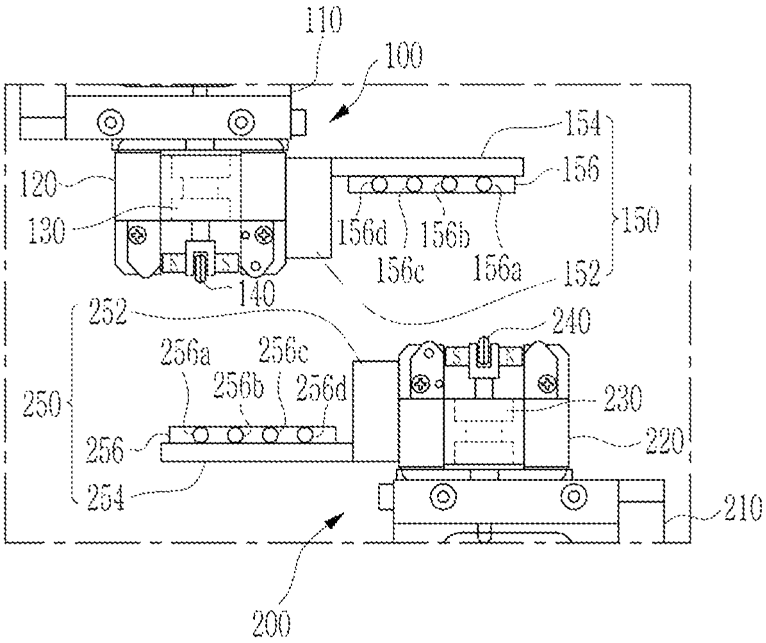

As shown in FIG. 17, the lower holder rotation inducing magnetic portion 156 of the upper cutting portion 100 may be moved to the top side, and the upper holder rotation inducing magnetic portion 256 of the lower cutting portion 200 may be moved to the bottom side. By moving the upper stage 154 to the top side by the upper cylinder 152, the lower holder rotation inducing magnetic portion 156 may be moved to the top side. Accordingly, the distance between the lower holder rotation inducing magnetic portion 156 and the lower cutting portion 200 may increase. By moving the lower stage 254 downward by the lower cylinder 252, the upper holder rotation induction magnetic body part 256 may move to the bottom side. Accordingly, the distance between the upper holder rotation inducing magnetic portion 256 and the upper cutting portion 100 may increase.

Figure 18:
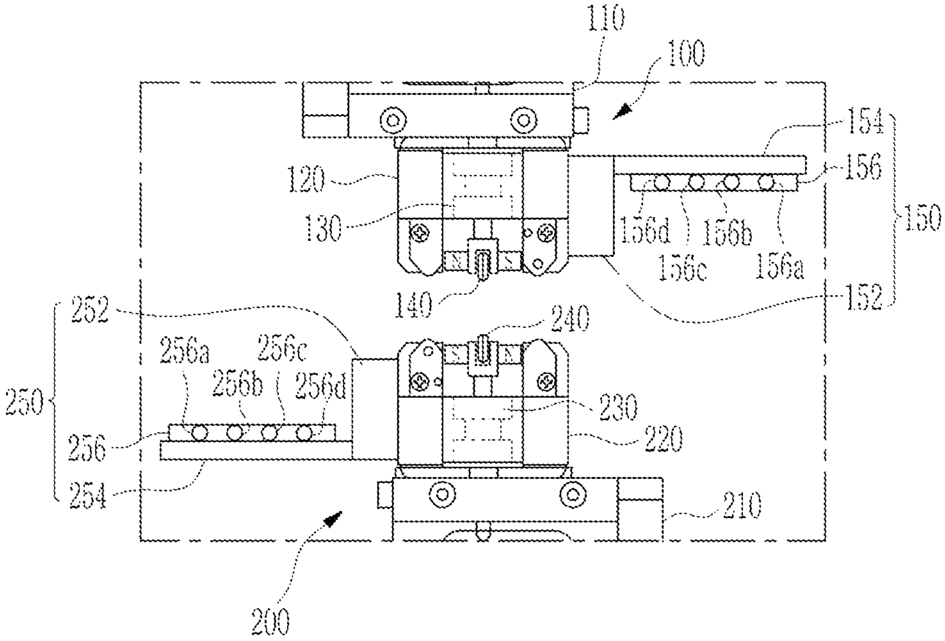

As shown in FIG. 18, the upper cutting portion 100 and the lower cutting portion 200 may be positioned to face each other, and the substrate may be cut. The moving direction of the upper cutting wheel 140 and the lower cutting wheel 240 shown in FIG. 12 may be different from the moving direction of the upper cutting wheel 140 and the lower cutting wheel 240 shown in FIG. 18. By changing the rotation direction of the upper holder 130 and the lower holder 230 by use of the upper holder rotation inducing portion 250 and the lower holder rotation inducing portion 150, the moving directions of the upper cutting wheel 140 and the lower cutting wheel 240 may be controlled. The substrate may be cut by changing the moving directions of the upper cutting wheel 140 and the lower cutting wheel 240, and there is no need for an additional space for a wheel turn. Hence, quality issue of the display device due to the damage of the substrate may be prevented in the process for cutting a substrate. Also, the cutting wheel damage may be prevented in the process of turning a wheel.

While this disclosure has been described in connection with what is considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A cutting device comprising:
- an upper cutter, and
- a lower cutter disposed under the upper cutter, wherein
- the upper cutter includes:
  - an upper head portion movable in a first direction and a second direction;
  - an upper holder connected to the upper head portion; and
  - an upper cutting wheel connected to the upper holder,
- the upper holder includes:
  - an upper body portion connected to the upper head portion;
  - an upper cutting wheel fixing portion rotatable with respect to the upper body portion; and
  - an upper magnetic portion disposed on sides of the upper cutting wheel fixing portion, and including a magnetic substance, and
- the lower cutter includes:
  - a lower head portion movable in the first direction and the second direction;
  - a lower holder connected to the lower head portion;
  - a lower cutting wheel connected to the lower holder; and
  - an upper holder rotation inducer connected to the lower head portion and including a magnetic substance, wherein
- the upper holder rotation inducer includes:
  - a lower cylinder connected to a first side of the lower head portion;
  - a lower stage movable in a third direction by the lower cylinder, the third direction being perpendicular to the first direction and the second direction; and
  - an upper holder rotation inducing magnetic portion disposed on the lower stage.

2. The cutting device of claim 1, wherein
- the upper magnetic portion includes:
  - a first magnetic substance disposed on a first side of the upper cutting wheel fixing portion; and
  - a second magnetic substance disposed on a second side of the upper cutting wheel fixing portion, and
  - the first magnetic substance and the second magnetic substance have opposite polarities.

3. The cutting device of claim 2, wherein
- the upper cutting wheel rotates in association with movement of the upper head portion, and
- a rotation axis of the upper cutting wheel is spaced from a fixation axis of the upper body portion in a direction opposite to a moving direction of the upper head portion.

4. The cutting device of claim 3, wherein
- the first magnetic substance is disposed on a left side of the upper cutting wheel with respect to the moving direction of the upper head portion and has N-polarity, and
- the second magnetic substance is disposed on a right side of the upper cutting wheel with respect to the moving direction of the upper head portion and has S-polarity.

5. The cutting device of claim 1, wherein
- the upper holder rotation inducing magnetic portion includes a first rotation inducing portion, a second rotation inducing portion, a third rotation inducing portion, and a fourth rotation inducing portion sequentially disposed in the first direction,
- the first rotation inducing portion and the second rotation inducing portion include an S-polarity magnetic substance and an N-polarity magnetic substance disposed in the second direction,
- the third rotation inducing portion and the fourth rotation inducing portion include an S-polarity magnetic substance and an N-polarity magnetic substance disposed in the first direction,
- an orientation of the S-polarity magnetic substance and the N-polarity magnetic substance of the first rotation inducing portion and an orientation of the S-polarity magnetic substance and the N-polarity magnetic substance of the second rotation inducing portion are opposite to each other, and
- an orientation of the S-polarity magnetic substance and the N-polarity magnetic substance of the third rotation inducing portion and an orientation of the S-polarity magnetic substance and the N-polarity magnetic substance of the fourth rotation inducing portion are opposite to each other.

6. The cutting device of claim 5, wherein the S-polarity magnetic substance of the third rotation inducing portion and the S-polarity magnetic substance of the fourth rotation inducing portion are integral with each other.

7. The cutting device of claim 1, wherein the lower holder includes:
- a lower body portion connected to the lower head portion;
- a lower cutting wheel fixing portion rotatable with respect to the lower body portion; and a lower magnetic portion disposed on respective sides of the lower cutting wheel fixing portion and including a magnetic substance, the upper cutter includes a lower holder rotation inducer including a magnetic substance, and the lower holder rotation inducer is connected to the upper head portion.

8. The cutting device of claim 7, wherein the lower magnetic portion includes:

a third magnetic substance disposed on a first side of the lower cutting wheel fixing portion; and a fourth magnetic substance disposed on a second side of the lower cutting wheel fixing portion, and the third magnetic substance and the fourth magnetic substance have opposite polarities.

9. The cutting device of claim 8, wherein the lower cutting wheel rotates in association with movement of the lower head portion, and a rotation axis of the lower cutting wheel is spaced from a fixation axis of the lower body portion in a direction opposite to a moving direction of the lower head portion.

10. The cutting device of claim 9, wherein the third magnetic substance is disposed on a left side with respect to the moving direction of the lower head portion and has S-polarity, and the second magnetic substance is disposed on a right side with respect to the moving direction of the upper head portion and has N-polarity.

11. The cutting device of claim 7, wherein the lower holder rotation inducer includes:

an upper cylinder connected to a first side of the upper head portion;

an upper stage movable in a third direction that is perpendicular to the first direction and the second direction by the upper cylinder; and a lower holder rotation inducing magnetic portion disposed under the upper stage.

12. The cutting device of claim 11, wherein the lower holder rotation inducing magnetic portion includes a fifth rotation inducing portion, a sixth rotation inducing portion, a seventh rotation inducing portion, and an eighth rotation inducing portion sequentially disposed in the first direction, the fifth rotation inducing portion and the sixth rotation inducing portion include an S-polarity magnetic substance and an N-polarity magnetic substance disposed in the second direction, the seventh rotation inducing portion and the eighth rotation inducing portion include an S-polarity magnetic substance and an N-polarity magnetic substance disposed in the first direction, an orientation of the S-polarity magnetic substance and the N-polarity magnetic substance of the fifth rotation inducing portion and an orientation of the S-polarity magnetic substance and the N-polarity magnetic substance of the sixth rotation inducing portion are opposite to each other, and an orientation of the S-polarity magnetic substance and the N-polarity magnetic substance of the seventh rotation inducing portion and an orientation of the S-polarity magnetic substance and the N-polarity magnetic substance of the eighth rotation inducing portion are opposite to each other.

13. The cutting device of claim 12, wherein the S-polarity magnetic substance of the seventh rotation inducing portion and the S-polarity magnetic substance of the eighth rotation inducing portion are integral with each other.

* * * * *